US008649380B2

(12) United States Patent
Mortier et al.

(10) Patent No.: US 8,649,380 B2
(45) Date of Patent: Feb. 11, 2014

(54) DISTRIBUTED NETWORK MANAGEMENT (75) Inventors: Richard Mortier, Redmond, WA (US); Rebecca Isaacs, Mountain View, CA (US); Paul Barham, Cambridge (GB)

(73) Assignee: Microsoft Corporation, Redmond, WA (US)

(*) Notice: Subject to any disclaimer, the term of this patent is extended or adjusted under 35 U.S.C. 154(b) by 68 days.

(21) Appl. No.: 13/300,608

(22) Filed: Nov. 20, 2011

(65) Prior Publication Data
US 2012/0063323 A1 Mar. 15, 2012

Related U.S. Application Data (63) Continuation of application No. 11/203,011, filed on Aug. 12, 2005, now Pat. No. 8,077,718.

(51) Int. Cl.
*H04L 12/28* (2006.01)
(52) U.S. Cl.
USPC .......................................... 370/392; 709/224

(58) Field of Classification Search
USPC ................. 370/229–236, 254–257, 389, 392; 709/224, 242
See application file for complete search history.

(56) References Cited

U.S. PATENT DOCUMENTS

| 5,862,348 | A  | * | 1/1999 | Pedersen ........................ 709/229 |
| 6,477,572 | B1 | * | 11/2002 | Elderton et al. .............. 709/224 |
| 7,792,991 | B2 | * | 9/2010 | Shand ........................... 709/241 |
| 7,818,605 | B2 | * | 10/2010 | Dillinger et al. .............. 714/4.1 |
| 8,077,718 | B2 | * | 12/2011 | Mortier et al. ................ 370/392 |

* cited by examiner

*Primary Examiner* — Dang T Ton
*Assistant Examiner* — Mandish Randhawa (57) ABSTRACT Hosts or end-systems residing at the edges of a network gather data about the traffic they transmit into and receive from the network. The network's routing protocol (typically a link-state protocol such as OSPF) is monitored and routing data or packets are used to recover the network's current status and topology. This data can be collected, fused, and maintained and a platform, preferably distributed, can be provided to query the data, thus enabling a variety of network management applications.

20 Claims, 6 Drawing Sheets

| start time | most recent time | process name | flow dir | #pkts | #bytes | proto | source IP | dest IP | src port | dest port |
|---|---|---|---|---|---|---|---|---|---|---|
| ... | | | | | | | | | | |
| 1122984637.651879 | 1122984910.151475 | svchost.exe | OUT | 6 | 555 | 17 | 157.58.56.89 | 157.58.63.8 | 1033 | 53 |
| 1122984615.933164 | 1122984899.151488 | Communicator.exe | IN | 8 | 13114 | 6 | 157.54.46.10 | 157.58.56.89 | 5061 | 2517 |
| 1122984631.651891 | 1122984899.151488 | Communicator.exe | OUT | 5 | 5677 | 6 | 157.58.56.89 | 157.54.46.10 | 2517 | 5061 |
| 1122984890.964005 | 1122984900.151488 | avant.exe | OUT | 7 | 4063 | 6 | 157.58.56.89 | 172.31.40.111 | 3449 | 80 |
| 1122984752.151712 | 1122984809.120373 | avant.exe | OUT | 5 | 2449 | 6 | 157.58.56.89 | 172.31.40.111 | 3441 | 80 |
| 1122984890.964005 | 1122984899.151488 | avant.exe | IN | 8 | 11145 | 6 | 172.31.40.111 | 157.58.56.89 | 80 | 3449 |
| 1122984752.151712 | 1122984809.120373 | avant.exe | IN | 5 | 4650 | 6 | 172.31.40.111 | 157.58.56.89 | 80 | 3441 |
| 1122984637.651879 | 1122984879.448395 | gnotify.exe | OUT | 6 | 2010 | 6 | 157.58.56.89 | 65.53.196.29 | 1586 | 1745 |
| 1122984637.651879 | 1122984879.448395 | gnotify.exe | IN | 6 | 2210 | 6 | 65.53.196.29 | 157.58.56.89 | 1745 | 1586 |
| 1122984813.339117 | 1122984813.339117 | svchost.exe | IN | 1 | 58 | 6 | 157.58.63.14 | 157.58.56.89 | 139 | 1190 |
| 1122984879.448395 | 1122984879.448395 | gnotify.exe | OUT | 2 | 647 | 6 | 157.58.56.89 | 157.58.63.16 | 3445 | 80 |
| 1122984637.651879 | 1122984637.651879 | iexplore.exe | OUT | 2 | 1160 | 6 | 157.58.56.89 | 157.58.63.16 | 3437 | 80 |
| 1122984879.448395 | 1122984879.448395 | gnotify.exe | IN | 2 | 253 | 6 | 157.58.63.16 | 157.58.56.89 | 80 | 3445 |
| ... | | | | | | | | | | |

DISTRIBUTED NETWORK MANAGEMENT

RELATED APPLICATIONS

This application is a continuation of prior application Ser. No. 11/203,011, filed Aug. 12, 2005. The aforementioned application Ser. No. 11/203,011 is incorporated herein by reference.

BACKGROUND

Network management is a loosely defined field covering areas such as performance management, configuration management, fault management, security management, accounting, and others. Because large IP networks are difficult to manage, network management tools have been used. Network management tools or platforms generally collect and provide information about the current, recent, or historical status of a network, either for presentation to operators or for allowing applications to generate network control operations. Consider the following issues related to network management and tools for network management.

Many autonomous or enterprise IP networks are large, complex, and dynamic, making them difficult to manage. Network management tasks such as monitoring traffic in a network, analyzing the network's performance, or reconfiguring the network for improved performance require information about the network. However, because large IP networks are highly dynamic, it is difficult to acquire information useful for many network management tasks. Consider that a large IP network may have tens of thousands of nodes and hundreds of routers and gateways. A large corporate network may have 300,000 nodes and 2,500 routers. Routers, gateways, switches, and other network devices sometimes fail, go offline, or return to service. Links often fail, return to service, or degrade in performance. For instance, a microwave or satellite link may experience interference that reduces its bandwidth. Protocols such as OSPF and BGP that are used to route traffic in large IP networks are dynamic and change the routing paths in a large network as conditions change in the network. Even relatively stable networks can take a long time to reach a state of routing convergence. By design, the path of communication between two computers on an IP network can change even during the period of a single connection between them. In view of these factors and others discussed below, it has been difficult for network management tools to obtain information that over time paints a somewhat complete and accurate picture of a network.

Another problem with network management has been cost. Network complexity makes managing networks expensive as it has required manual intervention by skilled human operators. Configuration and management of a large IP network has been difficult to automate. This necessity for close human oversight has led many operators to adopt a conservative policy of preferring network stability over frequent reconfiguration to optimize network performance. Thus, another problem in the field of network management has been that IP networks retain suboptimal network configurations for longer than required, leading to inefficient use of expensive bandwidth capacity and potentially higher communication latencies than otherwise possible. Tools for automated management and configuration have not been widely adopted.

Although tools for network management do exist, they are unsophisticated and have many shortcomings. Most network management tools simply discover and poll live network devices to generate reports containing maps, counter values, averages, areas of high traffic, and so on. Current tools tend to ignore the global dynamics of network behavior, concentrating on centrally unifying potentially conflicting data taken locally from individual network devices. Current tools do not make it easy for an operator to perform a variety of potentially useful tasks such as discovering the path a particular set of traffic takes through the network, investigating the behavior of the network in 'whatif' scenarios, monitoring the evolution of the network as failures and recoveries occur, or analyzing network traffic as it relates to particular applications or services, and so on.

For example, consider a company's IT manager who has been asked to consolidate the company's email servers at a single site. No tools exist to help the manager work out the impact on the network and identify any reconfiguration that may be necessary due to the probable change in traffic patterns. There is no information that tells the manager about network traffic for email in view of the topology of the network. Most likely the IT manager would have to build ad hoc simulations of the company's network using generic traffic and failure distributions, possibly estimating parameters from measurement samples if they were available.

There have been attempts to measure network traffic at individual user computers, but host traffic data has been limited in scope and generally cannot reveal information related to traffic flow along particular paths in an IP network. Host or end-system network measurement does not provide useful information about network topology. There are also tools that aggregate IP traffic data at network devices such routers and switches. For example, NetFlow from Cisco Systems. However, these approaches have proven inadequate for numerous reasons such as opaque (e.g., encrypted, tunneled) traffic, complex application communication patterns, sampling artifacts, load on routers introduced by monitoring, and others.

Network management tools have related to two main areas, among others. First, tools have been used for the definition and handling of management information for use by network management applications. This involves appropriate collection and presentation of data: filtering, storage, liveness, and so on, sometimes using standardized MIBs (management information bases, which are database tables) for TCP/IP. Internet MIBs store information such as the IP addresses a router has observed as active, per-port byte and packet counts, and general configuration information. Traps might be set to notify a listening management system that a particular counter had peaked above, or was averaging more than, a set limit.

Second, network management tools have been used for the design of automated or adaptive management systems, which utilize the data stored and presented by the MIBs to control the system. Examples include the use of forward and backward inference for prediction and diagnosis in ATM networks, declarative logic rules applied to an object oriented database network model, and the combination of declarative logic with active and temporal databases. Current IP network management products make extensive use of device MIBs, using ICMP Echo (ping) for initial device discovery, and then SNMP (Simple Network Management Protocol) to get/set MIB entries and to allow devices to asynchronously trigger actions in listening management systems via traps. Cisco routers also support NetFlow, a built-in sampling system able to present data to management systems concerning the current traffic at a router.

Unfortunately, none of these management tools or systems are satisfactory. They require extensive and correct MIB support in the tool and on the devices managed thereby. Existing tools tend not to scale well, generating large volumes of data where core network solutions such as NetFlow are deployed. They typically cannot provide an accurate, detailed view of network behavior, due to the significant CPU and network load that frequent SNMP polling generates. NetFlow also suffers from the limitation that it uses sampling techniques to monitor traffic, giving rise to sampling artifacts and limiting its maximum accuracy in the face of short lived traffic patterns. Even where these types of tools are successfully deployed, they do not address some of the fundamental problems related to the dynamic behavior of networks.

SUMMARY

The following summary is included only to introduce some concepts discussed in the Detailed Description below. This summary is not comprehensive and is not intended to delineate the scope of protectable subject matter, which is set forth by the claims presented at the end.

Hosts or end-systems residing at the edges of a network gather data about the traffic they transmit into and receive from the network. The network's routing protocol (typically a link-state protocol such as OSPF) is monitored and routing data or packets are used to recover the network's current status and topology. This data can be collected, fused, and maintained and a platform, preferably distributed, can be provided to query the data, thus enabling a variety of network management applications.

Many of the attendant features will be more readily appreciated by referring to the following detailed description considered in connection with the accompanying drawings.

DESCRIPTION OF THE DRAWINGS

Like reference numerals are used to designate like parts in the accompanying Drawings.

DETAILED DESCRIPTION

Embodiments discussed below relate to obtaining information for managing networks, and in particular large enterprise IP networks where routing data is available for recovery of topology, and where end-systems are highly controlled so that end-systems or hosts are capable of being configured to provide real-time network flow data.

Managing an IP network requires information about the flow of IP traffic through the network, sometimes in near real time. As mentioned above, current solutions use technology operating at routers and switches in the network to report information (typically aggregate statistics) about traffic that flows through these devices and the status of these devices. Embodiments discussed below can gather from hosts or end-systems residing at the edges of a network data about the traffic they transmit into and receive from the network. The network's routing protocol (typically a link-state protocol) can be monitored and routing data can be used to recover the network's current status and topology. This data can be collected, fused, and maintained and a platform, preferably distributed, can be provided to query the data, thus enabling a variety of network management applications. In particular this data can be used to feed accurate simulations of the network to perform "what-if" analysis, and hence automatically reconfigure the network according to the operators' desires.

Figure 1:
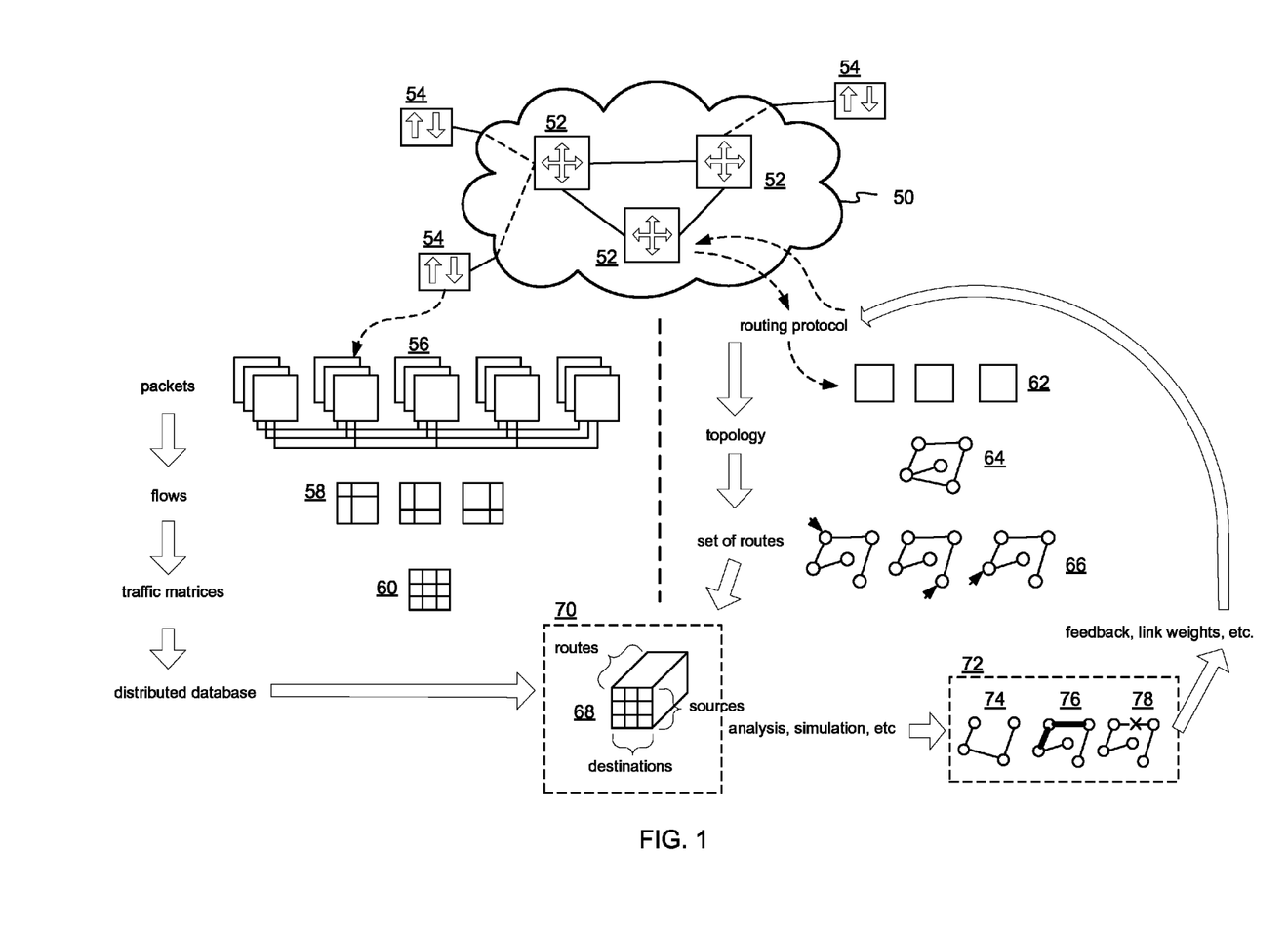
FIG. 1 shows a system for collecting and combining host flow information and routing information.

FIG. 1 shows a system for collecting and combining host flow information and routing information. In FIG. 1, an enterprise or autonomous IP network 50 is an IP network to be monitored or managed. The IP network 50 in FIG. 1 is shown as a simple network, however, a typical network will usually have many routers, as well as gateways, subnets or areas, and any of the other features typical of non-trivial autonomous IP networks operated by entities such as corporations, universities, military branches, telecommunications providers, and others. These types of enterprise networks are well understood in the field of IP networking. Even a simple network such as IP network 50 will have at least a few networking devices such as routers 52, which can be interconnected by links of any current or future type; optical fibers, wireless, leased lines, etc. Routers 52 will use IP routing protocols such as OSPF (open shortest path first) or other link-state routing protocols, BGP (border gateway protocol), and any other current or future IP routing protocols. Thus, "IP" should be understood to refer to different versions or variations of internetworking protocols including possible future versions.

A network such as IP network 50 usually exists to provide data communication for various types of hosts or end-systems 54, which may be any type of device that functions as a communications end point on the network 50. User or end-systems 54 do not usually use IP routing protocols and do not usually perform general purpose transit-type IP routing, although they may sometimes perform specialized types of "routing" such as IP tunneling, network address translation (NAT), or others. End-systems 54 are usually workstations, servers, laptops, handheld computers, and so on, but should at least have the ability to capture information about their own network communications.

FIG. 1 shows a number of activities that combine to produce topology-informed flow data, including capturing flow activity on the end-systems (left side of FIG. 1), aggregating and disseminating the flow activity information, recovering network topology information from routing protocols (right side), and combining flow and topology information (lower middle) for presentation to management applications, search systems, analysis tools and so on.

Referring again to FIG. 1, end-systems 54 can be configured to capture information about their respective IP flows as they occur. Flow activity can be monitored in an end-system 54 in a variety of ways. Details of how end-systems can capture and collect flow data is discussed later with reference to FIGS. 3 and 4. The basic idea is that an end-system captures packet information 56 about incoming or outgoing IP packets as they are processed by the end-system. For example, if an end-system receives a TCP packet it captures information about the packet that allows flow information to be derived. Preferably, packet information 56 includes information identifying an IP source and/or an IP destination of the packet, and possibly other information such as packet size, duration, an associated service or application, source and/or destination ports, a protocol identifier identifying the packet's protocol, a time at which that the packet was received or transmitted by the end-system, information available from a packet's header, and so on.

The per-packet packet information 56 is processed into corresponding flows 58 (an example of a set of flows 58 is discussed later with reference to FIG. 4). This can be done by having the end-system store its packet information 56 and later synthesizing it into flows 58 as needed. Preferably though, the end-system initiates a new flow record when it receives a first packet of a flow, and rather than storing information about a particular packet the end-system continues to update the record of that packet's flow (e.g., incrementing a total byte or packet count) as new packets for the flow are received. This kind of on-the-fly flow synthesis saves storage space and improves the time that it takes to search for information about flows.

A flow 58 is an instance of communication flow between end-systems 54, one of which may or may not be an end-system residing on some autonomous network other than the subject IP network 50. In terms of TCP/IP, a flow 58 may be compared to a network connection from its inception to its termination, a session of some protocol, or a time during which two end-systems were in communication. A flow 58 should include information identifying the flow's source end-system and/or the flow's destination end-system, and optionally information about the flow, such as any of the pieces of information mentioned above (protocol number, ports, associated application, etc.) as well as summary information such as a number of packets that were sent/received via the flow, an amount of data communicated, a start and end time of the flow, and so forth. As discussed later, the information about the source and/or destination end-systems (e.g., IP addresses, hostnames) allows flows to be related to information about the topology of the IP network 50.

Returning again to FIG. 1, flows 58 can be combined, either explicitly or as needed from various end-systems 54 to form flow matrices 60. A flow matrix 60 is a matrix of flows where one dimension represents source end-systems 54, and another dimension represents destination end-systems 54. A location or element in the traffic matrix 60 is a flow or bandwidth usage between the corresponding source and destination end-systems. In other words, flows are logically aggregated and combined to construct a complete traffic matrix 60 $A_{ij} = \{$bandwidth from src i to dst j$\}$, and each entry $a_{ij}$ can be annotated with the route from i to j. In one embodiment, the traffic matrix 60 may be distributed among various end-systems 54 and queried as needed. In yet another embodiment, the flow and/or the routing data may be stored and accessed without using a distribute search system. For example, at a single database server or database server cluster could store the information. This embodiment is practical with smaller networks.

As mentioned, flow information such as traffic matrix 60 is used together with information about the topology of the network 50. The right hand side of FIG. 1 shows generally how information about the topology of the network 50 can be acquired and processed. First, routing information 62 is acquired from the routers 52. The routing information 62 may be, for example, OSPF packets such as LSA (link state advertisement) packets sent by routers 52 to advertise their current link states. In one embodiment, a passive or "dummy" router is added to the network 50 and receives routing information such as link-state routing packets. In some cases it may also be possible to obtain routing information 62 from router trace files, end-systems configured as an OSPF node, and so on. However, using live routing packets provides a real-time picture of the network. Because most link-state protocols such as OSPF flood each router's routing information to all routers of a network, it is possible for a passive router or other type of collector, by simply participating in the routing network, to acquire sufficient information to reconstruct the topology 64 of the network 50 and determine routes through the map or topology 64. Specifically, a link state database can be constructed and the routes between any end-systems 54 can be known currently or, as routing information 62 is accumulated, routes 66 between any end-systems can be determined for different given times. In other words, link-state protocols involve each router flooding information about the routers to which it is connected. Each router participating in the protocol (including a passive collector) thus builds a complete topology map of the network and constructs routes by running a shortest-path algorithm across this map.

Other types of routing protocols may be used. For example, distance-vector protocols such as BGP can be tapped. However, topology recovery is somewhat more complex than with link-state protocols. An inference process using information feeds from as many routers as possible can be used to construct constraints about which routers are closer (i.e., have lower cost paths) to which destinations, and a topology satisfying these constraints can then be built. Another approach is to collect configuration files of routers and use their information about BGP session connectivity, which can be rendered dynamic if used in conjunction with link-state techniques discussed above.

Routing protocols such as OSPF are well understood in the field of networking and detailed explanation is not necessary. Furthermore, Internet RFCs (Requests For Comments) for the various versions of the OSPF protocol can be consulted to determine how to reconstruct a link state database or topology model from LSA packets and any other information that is sometimes exchanged between routers to enable them to determine how to route data packets. Other aspects of collecting and using routing information will be discussed later with reference to FIG. 5.

At the lower middle part of FIG. 1 is a combined flow-topology dataset 68. The flow-topology dataset 68 is combination of individual source-destination flows mapped to routes 66. The flow-topology dataset 68 provides a rich set of data for mining by network management applications. Due to the nature of end-system flow collection, the flow-topology dataset 68 can not only provide visibility for flows related to protocols that are opaque to devices in the network core (e.g. the IP security protocol), but it can also expose both the application-level semantics of traffic and its treatment inside the network.

The flow data can be combined with the topology or routing data in a number of ways. A flow record will preferably identify the end-system source and/or destinations, for example a source IP address and a destination IP address (see FIG. 4). The reconstructed model of the network's topology identifies the subnets or areas of the network. The IP addresses in flow records can be matched to the addresses of their corresponding subnets or areas using simple prefix matching. Because the model or routes of a network can change over time, flow and topology information can also be combined based on time.

Depending on the types of flow information collected by end-systems, some types of network information become available and different queries not previously possible can be performed. Consider that the flow information in the flow-topology dataset 68 is collected from end-systems (acting as network sensors), which may have a variety of data sources available, for instance round-trip-time estimators, per-flow bandwidth estimators, application protocol, port, and so on. The flow-topology dataset 68 can be used to accurately assign flows to applications even, given sufficient flow information, to different sub-parts of applications. This enables a rich set of queries to be posed and answered. Queries such as 'what is the contribution of link 1 to the delay experienced by the VoIP calls between h1 and h2?'. Fusing topology data with the end-system flow data can also enable estimating characteristics of a remote link without requiring direct or active measurement of the link. Characteristics of routers themselves can be similarly estimated by simply aggregating estimates of the characteristics at the common router to a set of links.

Various uses for the flow-topology dataset 68 are shown in FIG. 1. On the lower right hand side of FIG. 1 is a generic network management application 72. Network management application 72 can use the flow-topology dataset 68 to analyze a particular route 74, or to see how the flows would have passed through the network 50 if certain links were assigned a different metric in a hypothetical topology 76, or to see how the network 50 might behave given a topology 78 with some link disabled.

Figure 2:
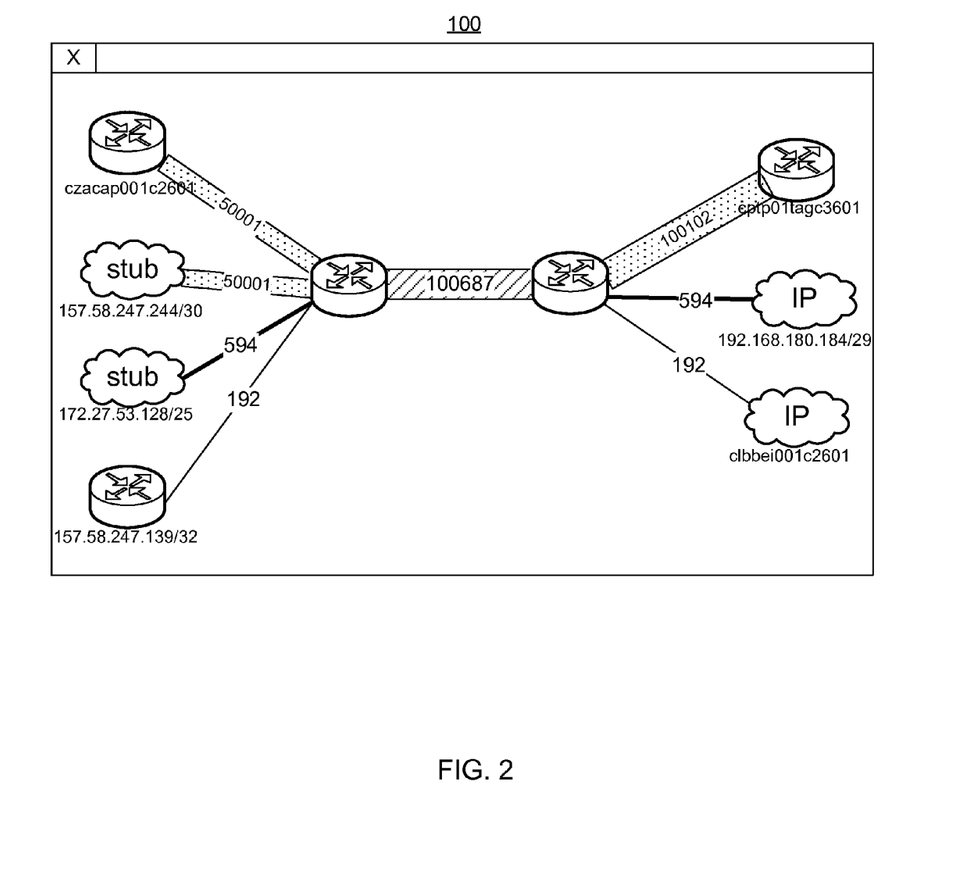
FIG. 2 shows a user interface of a network management application.

FIG. 2 shows a user interface 100 of a network management application 72. Information such as that shown in FIG. 2 can be readily obtained from the flow-topology information. A link of interest is in the center, perhaps highlighted by a user. On the left are links that are currently feeding traffic into the link of interest, and on the right are the links that are being fed by the link of interest. All links are annotated with their current load. This type of data visualization is relatively straightforward given an appropriate fusion of flow and topology information.

Figure 3:
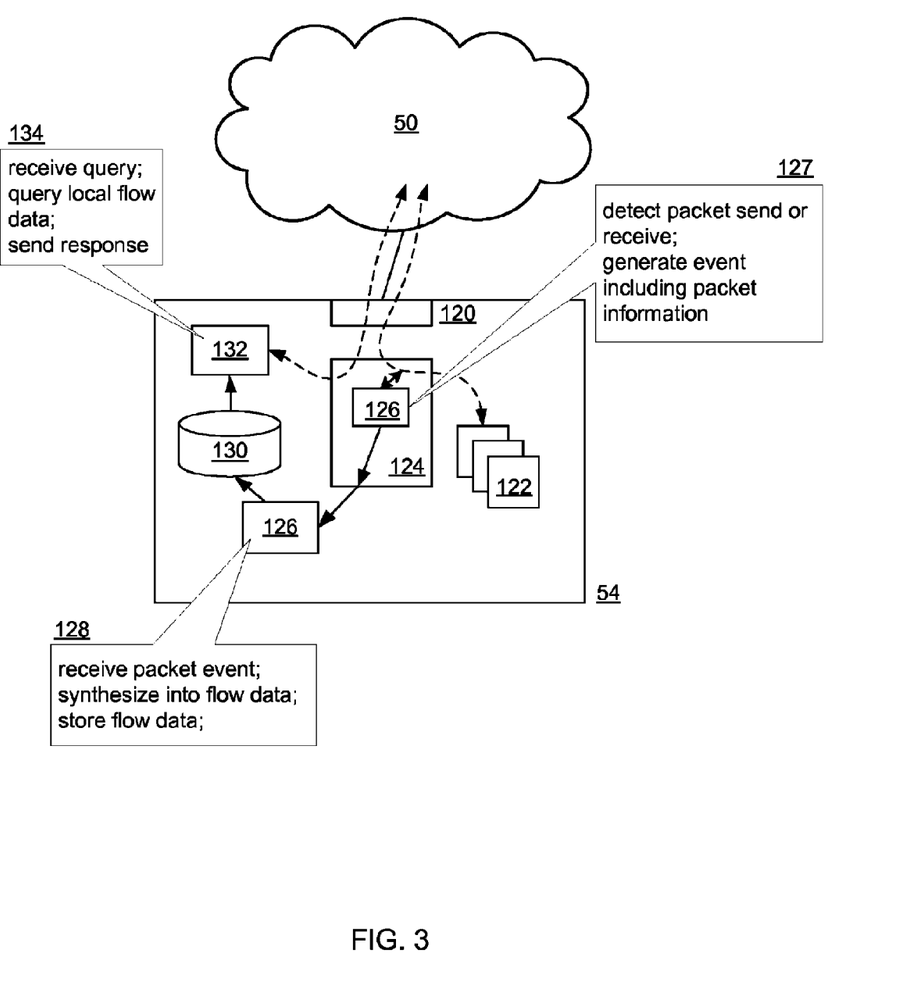
FIG. 3 shows an example of an end-system configured for flow collection.

FIG. 3 shows an example of an end-system 54 configured for flow collection. A network interface 120 provides access to the network 50. Applications 122 send and receive data over the network, and various operating system 124 services, protocol stacks, stream systems, etc. (not shown) handle the details and overhead of the communication. A module such as a passthru driver 126 generates information or events for each packet handled by the operating system 124 (note that the operating system 124 can itself act as an application). The passthru driver 126 performs a process 127 of detecting sent or received packets and generating an event that includes previously mentioned packet information. The passthru driver 126 can be thought of as a software "tap" into end-system 54's network communications pathway. Preferably, the operating system itself will provide the packet or flow information, but in cases where the operating system's protocol stack cannot be directly modified, the passthru approach is a reasonable alternative.

The packet events are passed to another module or event consumer 126 that can read the format of the packet events and translate them into flow information using a process 128, roughly, of receiving packet events, synthesizing them into flow data, and storing the flows into a database or data store 130. Synthesis into flow data can involve a process of correlating related packets (those belonging to the same flow) and summarizing their relevant information into a flow record. For example, packet events that correspond to a given telnet connection might be condensed into a single flow record that reflects the duplicative information found in each of the connection's packets as well as cumulative statistics (e.g. byte count) and other information (e.g. time of first packet, time of last packet, etc.).

Finally, end-system 54 has an aggregation/search component 132 that provides access to the local flow data stored in the data store 130 using a process 134 such as receiving queries, searching the local flow data store 130, and returning a response. The aggregation/search component 132 can be software for participating as a peer in a peer-to-peer network. The way that network data is shared and accessed across the network can vary widely depending on needs and network conditions. In a stable network with relatively few queries, it may be advantageous for each end-system to keep its own copy of flow data. In rapidly changing networks with many queries, it may be preferable to increase data redundancy or dispersion. In any event, an advantage over a pure router-based network monitoring approach is that end-systems as a whole have significant combined storage and processing capacity. Router-based collection systems are limited by the resources of the routers that they reside on and the resources of the statically designated collection points which receive network monitored data from the routers. Using end-systems for collection, storage, and searching makes it possible to provide a rich set of network data without significantly adding to the load of the operation of the network itself.

For end-systems 54 running a version of Microsoft Windows, a passthru driver 126 can be implemented as an Event Tracing for Windows (ETW) "producer", posting events as packets enter, traverse, and leave the stack. ETW is a low overhead event posting infrastructure. Such a passthru driver 126 can be readily prepared by modifying a sample driver available as part of a Windows Driver Development Kit (DDK). A consumer 126 such as an ETW consumer then runs in user-space and synthesizes flow data using the packet data events from the provider. Preferably, the provider would not be a separate device driver but instead the kernel would be extended to provide these events (the Windows kernel already provides events for TCP/IP send and recv calls, for example). This approach is efficient and flexible. The ETW subsystem is efficient, imposing a CPU load of around 5% when posting 20,000 events per second. Or, approximately 1500 cycles for each ETW. Furthermore, by restricting kernel-space instrumentation to posting events based on packet headers, the definition of a flow can easily be modified. Since flow data is synthesized in user-space, the code to do this can easily be updated, or even made extensible based on the query in progress.

Figure 4:
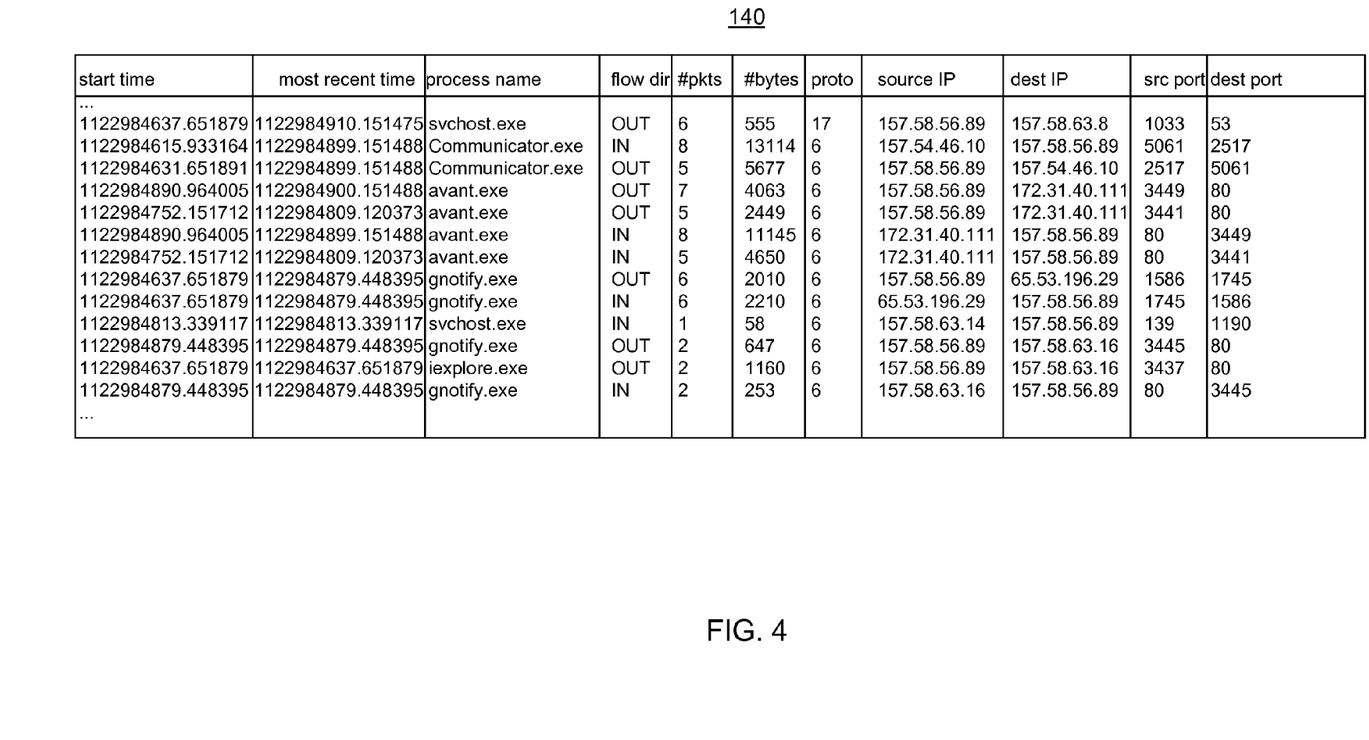
FIG. 4 shows an example of flows or flow records stored either locally in an end-system that generated them or in an aggregator end-system that collects flows from other preferably local end-systems.

FIG. 4 shows an example of flows or flow records 140 stored either locally in an end-system that generated them or in an aggregator end-system that collects flows from other preferably local end-systems. As seen in FIG. 4, a wide variety of information can be included in a flow record. The start and end time of a flow allow a flow to be tied to different paths that may be used during the lifetime of a flow. Recall that most IP networks use dynamic routing protocols; the network's idea of the shortest path between end-systems can change while those systems are communicating. Knowing the time period of a flow allows the flow to be mapped to different routes or paths that the flow's packets may have traveled during the lifetime of the flow. Providing the identity of a process or application associated with a flow (e.g., iexplore.exe) can also allow highly specialized application-centric network traffic analysis. Protocols, ports, and other information can also shed light on patterns of network use.

It should be noted that not all end-systems 54 for a given network will need to collect flow information. In some cases a select subset of end-systems may provide sufficient information to extrapolate for the entire network. In one embodiment, at least one end-system on each subnet will be collecting flow information. In another embodiment a set of end-systems are selected that represent a fair cross-section of end-systems over the entire network, considering that different end-systems can have very different flow patterns. In yet another embodiment, the machines used for flow collection depends on the queries to be answered. If queries concentrate on per-link load (in terms of bytes, packets, flows, etc), then just a few busy servers (<1% machines) is sufficient for very accurate results. If queries pertain to the behavior of particular users throughout the network, then the client or end-system machines (having the user context) need to be involved. In any case, generally, as more end-systems are configured for flow capture results of queries should become more accurate. Furthermore, collection for various hosts can be activated or deactivated as needed. If the collection and providing services of an end-system are configured to run as system services, these services can be activated and deactivated remotely. If a significant number of end-systems are collecting flow data, the resulting overall information about the network will not be vulnerable to the comings and goings of individual end-systems.

Due to the particular traffic patterns seen in enterprise networks, in particular, the extensive use of client-server applications, in some cases it is sufficient to configure only or predominantly the relevant servers, which can provide the majority of the network's flow. An analysis of a large corporate network showed that client-server communications comprised 99% of the network's flow. A system relying mostly on servers is applicable in ASP (Application Server Provider) networks, for example, where a service provider such as MSN wishes to monitor how its own network is impacting the service received by customers. Rather than instrumenting the many customer terminals, the server provider can get by with instrumenting its servers. The downside to this approach is that if mostly only one side of the communication is available to be captured (the server side), the amount of network information that can be determined is reduced.

Figure 5:
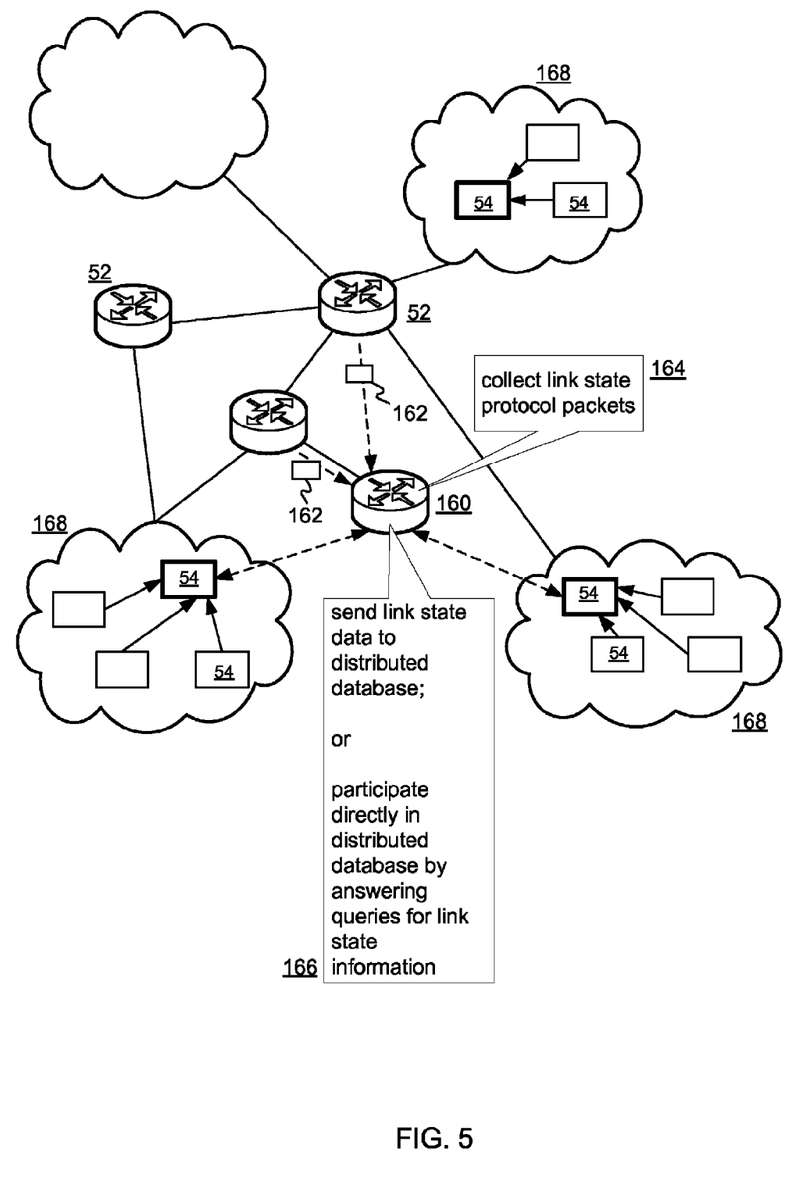
FIG. 5 shows how network topology information can be collected and made available for merger with flow data.

FIG. 5 shows how network topology information can be collected and made available for merger with flow data. In one embodiment, a passive route collector 160 can be used to collect routing information directly from other routers 52. For example, link state packets 162 are collected 164. This routing information can be locally processed into a network topology model that is then distributed or made available, or the routing information can be provided to end-systems for the same purpose. A sharing process can either send the routing information to distributed database (that also stored the flow information), or it can be stored at the collector 160 and requested or pulled as needed. The use of live routing packets is advantageous because it can give a real-time model of the network. The exact manner by which routing or topology information is injected into the system is not of particular importance, so long as the flow and routing/topology information are available (whether centralized, partially distributed, or fully distributed) at the same time for a given query.

The routing information can be supplemented with other types of router information. Data from router-based flow monitoring features such as NetFlow can be incorporated for extra detail about core network links and to improve/track the accuracy of results available from data from end-system monitoring.

Larger enterprise networks may also internally deploy the BGP (Border Gateway Protocol) since most link-state protocols have scaling limitations. Although more scalable, BGP is also more difficult to manage and understand. Even so, tools to collect BGP data from routers are available. As BGP is usually configured so that so-called peering sessions are single-hop rather than multi-hop, it is far less likely that passive snooping will work. However, BGP has many more mechanisms to protect itself from malicious routing data than most link-state protocols, so a more active monitoring approach can be used. A collector can form a BGP peering session with a router and configure the router not to accept any route updates from the collector. Note that BGP permits multi-hop sessions, so one collector can service multiple routers as no physical adjacency between the collector and the routers is required.

Whether pushed or pulled from collector 160, the routing information is preferably incorporated into a distributed database, which may use special aggregator end-systems (the thick-lined end-systems in FIG. 5) to intermediate search requests by end-systems 54. Distributed databases are known in the art and do not require in depth explanation. Systems such as MANDATE, Astrolabe, PIER, and SDIMS may all be consulted for guidance on the design of a distributed database. A distributed database for present purposes should be designed based on the need for scalability and distribution of the database, the inappropriateness of the ACID property (atomic, consistent, isolated, and durable), the requirement to support active database/trigger mechanisms (e.g., for generating network alarms), and the temporal nature of the data involved. The above-mentioned systems may serve as a useful starting point in designing or building a distributed database.

Figure 6:
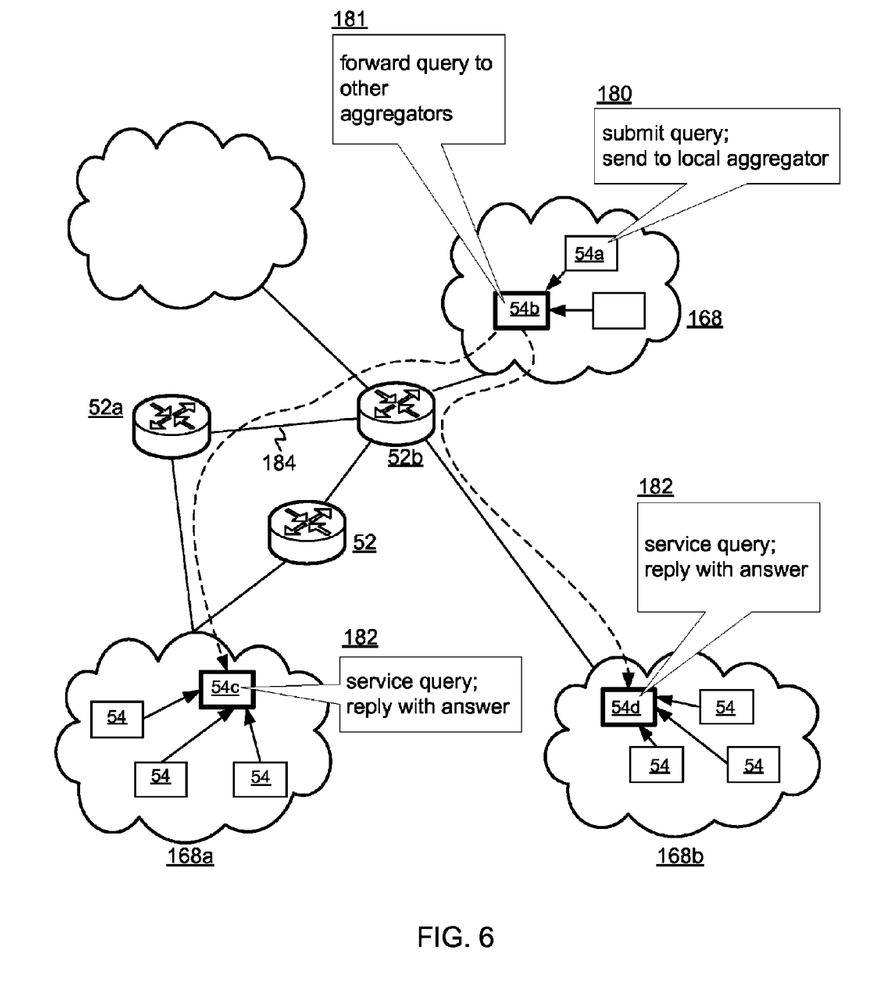
FIG. 6 shows an example of a distributed query.

FIG. 6 shows an example of a distributed query. An end-system 54a, possibly running a network management tool, initially submits 180 a query. The query may be something like 'report the current HTTP traffic between subnet 168a and subnet 168b'. If a layer of aggregators is used (thick-lined end-systems 54) then the initiating end-system 54a sends its query to the nearest local aggregator/end-system 54b. The aggregator/end-system 54b (or possibly the initiating end-system 54b) may use the current topology model to narrow the scope the search. In this example, it is easy to determine that the query need only be forwarded to aggregator/end-system 54c of subnet 168a and aggregator/end-system 54d of subnet 168b. In the alternative, the query could be broadcast and individual end-systems would use the topology model to determine whether they need to reply or not. In either case, after the query is forwarded 181, the aggregator/end-systems 54c, 54d perform a process 182 of servicing the query by searching locally for the flow data that satisfies the query and then replying with answers. The aggregator/end-systems 54c, 54d search locally either by querying their respective local end-systems 54 or by searching cached copies of the local flow data.

Another example query would be a query as discussed above but further restricted to traffic that passed through link 184. The search sequence would be similar to that discussed above. However, in this case, the topology model or reconstructed routes would be used to limit the search to flows that passed through link 184.

The tension in designing a distributed storage and search system will be between the desirability of efficient resource usage, usually best achieved by making explicit use of the natural hierarchy in the network design, and the desirability of a self-organizing robust data store, as provided by a distributed hash table. Another objective is to keep as much information explicit as possible, to avoid building models of network behavior (traffic patterns, arrival rates, protocol distributions, failure characteristics, etc) into the distributed platform. Furthermore, the database portion of the system can be designed to be self-tuning, to keep the network management system itself from becoming just another source of complexity for the human network operator.

How flow and/or topology data is distributed among nodes at different times or for different implementations can also depend on the characteristics of the data and on the types of queries expected to be executed on the data. To illustrate, consider the following two extreme examples. First, the network topology is highly stable, with links changing state (e.g., failing, recovering, reconfiguring) at a rate of <10 links per month, whereas hundreds of flows enter/leave the system every second at every node. Second, the network topology is extremely fragile, with tens of links failing and recovering every minute, whereas most traffic in the system is carried in a few hundred long-lived stable flows. In the first case it may make sense to distribute the network topology to every node in the system so that flow data need only be stored on the local node. In the second case the flow data should be distributed to the machines collecting the network topology.

In practice, networks usually fall somewhere between these extremes, and in particular, data characteristics are not usually homogeneous throughout a large enterprise network: in one area the topology may be very stable and so it will be feasible to distribute to all end-systems; in another area, the topology may be very fragile and greater efficiency and accuracy will be achieved by distributing flow data.

The distribution model can also be designed while taking into account the queries that applications will execute over the flow-topology dataset, whether once, periodically, or continuously. For example, to replicate the functionality of current network management tools, queries such as 'who are the top-10 traffic generators?' must be executed periodically (e.g. every 5 seconds). Such queries are straightforward to aggregate and have no dependency on the topology data. To provide the sort of visualization tools shown in FIG. 2 will require executing queries of the form 'what is the load on link 1?'. Results (or partial results) of such queries are straightforward to aggregate, but calculating them initially may benefit from knowledge of the system topology.

There are a number of advantages of embodiments discussed above. Consider a query for discovering the load on a path through the network. The current state of the art requires that all the devices (e.g., routers) along that path monitor their load and be available to answer queries about their load. Furthermore, there is no synchronization in the responses from the devices, leading to potential inaccuracy if the load on the path is changing. Embodiments discussed above can answer this type of query by using the current routing information to determine which end-systems might be transmitting traffic along that path (equivalently, which end-systems might be receiving traffic sent along that path) and then querying those end-systems (or proxies/aggregators acting on their behalf) for the traffic flows that actually contributed to the load on that path during a moment (possibly current) or period of interest. Many other applications can be built over such a platform: traffic anomalies visible via the platform can be used for intrusion detection; network and service performance in terms of latency can be calculated if suitable extra traffic data is made available to the platform. Such extra data might include the round-trip time estimates available from the TCP protocol implementation, for example.

Having established how to implement a system for providing combined flow-topology network data, a number of network management tasks can be performed based thereon. Referring back to FIG. 1, information about the network derived from the flow-topology data can be used to determine new weights for links in the network. This information can be fed to routers by application 72, thus allowing automatic configuration of the network, perhaps realizing high-level policies requiring dynamic network reconfiguration to be applied automatically and corrected as the network configuration changes. For example, the network can be dynamically reconfigured as capacity is added so that service level agreements are always met in the most efficient way possible. It might also be possible to actively respond to detected traffic anomalies to reconfigure the network to contain the effects of malicious traffic.

A management application can be provided with a real-time topology graph of the network with links color-coded by load to allow an operator to conveniently determine the target and entry-points of traffic causing distributed denial-of-service attacks, misconfigured servers, routers, or infected machines, which often generate peculiar traffic patterns that can potentially be tracked.

Various 'what-if' scenarios of the network can be simulated and analyzed to investigate and predict potential changes in topology, configuration, and traffic distribution. For example, by feeding live flow and topology information into a flow-optimization solver the current network configuration could be evaluated for efficiency and robustness. Proposed network modifications or potential failure scenarios can also be tested against current flow statistics in near real-time over a period of days or weeks, thus avoiding reliance on sampled statistics such as 'busy hours'.

Another application is the ability of network applications to query and self-adjust. As discussed above, end-system flow capturing allows detailed flow information to also be captured. For example, depending on how flow capture is implemented in a particular case, end-systems can capture information about a protocol transported by a flow, or ports used by a flow, or applications that were using the flow. This type of information makes it possible to query for application-level network information. For example, it is possible to determine how much a network's total traffic is attributable to email use in general (based on information about a protocol transported by a flow) or how much traffic is attributable to a particular email client (based on which applications used which flows). Interestingly, this kind of application-level network usage information can actually be used by an application to enable to application to self-tune its behavior. For example, an client application that uses a databases server might query about network traffic on the network and see from a response that database related traffic is particularly high on a link that the client application's server uses, or is high for the database server itself. The client application could then self-adjust its behavior by pointing itself to another database server that does not use the loaded link or that is itself less loaded. The client application can even query to determine database servers are available on the network.

In yet another embodiment, applications incorporate extra instrumentation enabling higher precision queries. For example, a database application incorporates instrumentation in different parts such as its report generation and output, its query processing, its data mirroring, etc, enabling operators to pose queries about the performance of just the report generation process. Applications with this kind of detailed information can perform real-time what-if scenario modeling, via persistent/continuous queries, and can self-adjust as determined to be necessary.

In conclusion, those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art, all or a portion of the software instructions may be carried out by a dedicated circuit, such as a DSP, programmable logic array, or the like. Furthermore, those skilled in the art will also appreciate that no further explanation is needed for embodiments discussed herein to be implemented on devices other than general-purpose computers. Robots, appliances, set-top boxes, game consoles, and other types of devices, can be readily designed with features discussed above.

All of the embodiments and features discussed above can be realized in the form of information stored in volatile or non-volatile computer or device readable medium. This is deemed to include at least media such as CD-ROM, magnetic media, flash ROM, etc., storing machine executable instructions, or source code, or any other information that can be used to enable a computing device to perform the various embodiments. This is also deemed to include at least volatile memory such as RAM storing information such as CPU instructions during execution of a program carrying out an embodiment.

The invention claimed is:

1. A method of providing queryable information about an IP network comprised of hosts and routers with IP (Internet Protocol) addresses in the IP network, the method comprising:
   receiving and storing a plurality of traffic flows from hosts in the IP network, the traffic flows having been obtained by the hosts by, for any given host:
      monitoring the transmission and receipt of packets on the given host to capture packet data as the packets are sent and received on the given host, and synthesizing the captured packet data to form and store a plurality of traffic flows, each traffic flow corresponding to a plurality of the packets that were all sent or received between a same source IP address and a same destination IP address via a same application, a same application-level protocol, or a same port, each traffic flow including a statistic derived from the packets in the corresponding plurality;
   receiving and storing, in association with the traffic flows, a plurality of routing paths, each routing path comprising indicia of one or more routers that routed some of the packets; and
   providing queryable access to the traffic flows and routing paths to allow a query to be answered.

2. A method according to claim 1, further comprising responding to a query by searching for a traffic flow and routing path that both correspond to the query.

3. A method according to claim 2, wherein the traffic flow corresponding to the query is found, and then an IP address of the traffic flow is used to identify the routing path that corresponds to the query.

4. A method according to claim 1, wherein the statistic is either a cumulative packet count or the statistic is a cumulative packet size.

5. A method according to claim 1, wherein each traffic flow corresponds to a session of communication by a particular application, a particular port, or a particular protocol, wherein the statistic of a traffic flow consists of data only transmitted via the corresponding application, port, or same application-level protocol and between the corresponding source IP address and destination IP address.

6. A method according to claim 1, wherein the traffic flows are stored in a distributed database distributed across the hosts.

7. A method according to claim 1, wherein the routing paths are derived from link-state protocol information obtained from the routers.

8. A method performed by one or more computers comprising:
   executing an application on a network;
   sending a query from the application to a system storing a plurality of traffic flows from hosts in the network, the traffic flows having been obtained by the hosts by, for any given host: monitoring the transmission and receipt of packets on the given host to capture packet data as the packets are sent and received on the given host, and synthesizing the captured packet data to form and store a plurality of traffic flows, each traffic flow corresponding to a plurality of the packets that were all sent or received between a same source address and a same destination address via a same application, a same protocol, or a same port, each traffic flow including a statistic derived from the packets in the corresponding plurality; the system also storing, in association with the traffic flows, a plurality of routing paths, each routing path comprising indicia of one or more routers that routed some of the packets;
   receiving, by the application, from the system, a response to the query, the response comprising network information derived from the traffic flows; and
   based on the response, self-adjusting by the application.

9. A method according to claim 8, wherein the self-adjusting comprises selecting a server from among a plurality of servers based on the network information in the response.

10. A method according to claim 8, the method further comprising displaying a real-time topology map of the network based on the traffic flows and routing paths.

11. A method according to claim 8, further comprising continuously querying the system by the application to perform the self-adjusting.

12. A method according to claim 8, wherein the network information includes a routing path from the stored plurality of routing paths.

13. A method according to claim 12, wherein the application uses the routing path to identify congestion and in response switches from a first server to a second server.

14. One or more computer-readable storage media storing information to enable one or more computers to perform a process, wherein the computer-readable storage media is not a signal, the process comprising:
   sending a query to a system storing a plurality of traffic flows from hosts in an IP network, the traffic flows having been obtained by the hosts by, for any given host: monitoring the transmission and receipt of packets on the given host to capture packet data as the packets are sent and received on the given host, and synthesizing the captured packet data to form and store a plurality of traffic flows, each traffic flow corresponding to a plurality of the packets that were all sent or received between a same source IP address and a same destination IP address via a same application, a same application-level protocol, or a same port, each traffic flow including a statistic derived from the packets in the corresponding plurality;
   storing, by the system, in association with the traffic flows, a plurality of routing paths, each routing path comprising indicia of one or more routers that routed some of the packets;
   receiving from the system a response to the query, the response comprising network information derived from the traffic flows; and
   based on the response, automatically reconfiguring the IP network to change how the IP network routes network traffic.

15. A computer-readable storage media according to claim 14, wherein the reconfiguring the IP network comprises computing link weights based on the response.

16. A computer-readable storage media according to claim 15, the process further comprising passing the link weights to one or more or the routers that then use the link weights to route traffic on the IP network.

17. A computer-readable storage media according to claim 14, wherein the query is transmitted by an application executing on a host on the IP network, the response is received by the application and the application computes the link weights and sends the link weights to the one or more routers.

18. A computer-readable storage media according to claim 17, wherein the application displays a real-time topology graph of the IP network.

19. A computer-readable storage media according to claim 14, the process further comprising passing the network information to a flow-optimization solver, the network information comprising flow information derived from the traffic flows and topology information derived from the routing paths.

20. A computer-readable storage media according to claim 19, the process further comprising detecting a network anomaly from the network information and reconfiguring the IP network accordingly.

\* \* \* \* \*